United States Patent
Paetzel

(10) Patent No.: US 7,164,703 B2
(45) Date of Patent: Jan. 16, 2007

(54) TEMPERATURE CONTROL SYSTEMS FOR EXCIMER LASERS

(75) Inventor: Rainer Paetzel, Dransfeld (DE)

(73) Assignee: Lambda Physik AG, Goettingen (DE)

( * ) Notice: Subject to any disclaimer, the term of this patent is extended or adjusted under 35 U.S.C. 154(b) by 318 days.

(21) Appl. No.: 10/777,434

(22) Filed: Feb. 12, 2004

(65) Prior Publication Data

US 2004/0202211 A1  Oct. 14, 2004

Related U.S. Application Data

(60) Provisional application No. 60/448,942, filed on Feb. 20, 2003.

(51) Int. Cl.
*H01S 3/04* (2006.01)
*H01S 3/22* (2006.01)

(52) U.S. Cl. ............... 372/57; 372/34; 372/35; 372/55

(58) Field of Classification Search ........... 372/34–35, 372/55–58
See application file for complete search history.

(56) References Cited

U.S. PATENT DOCUMENTS

| | | | | |
|---|---|---|---|---|
| 4,987,574 A | * | 1/1991 | Rowley et al. | 372/28 |
| 5,117,435 A | * | 5/1992 | Cook et al. | 372/59 |
| 5,377,215 A | | 12/1994 | Das et al. | 372/57 |
| 5,463,650 A | * | 10/1995 | Ito et al. | 372/57 |
| 5,617,440 A | * | 4/1997 | Meier | 372/61 |
| 5,631,917 A | * | 5/1997 | Ogawa et al. | 372/35 |
| 5,657,334 A | * | 8/1997 | Das et al. | 372/33 |
| 5,710,787 A | * | 1/1998 | Amada et al. | 372/25 |
| 5,748,656 A | * | 5/1998 | Watson et al. | 372/35 |
| 6,021,150 A | * | 2/2000 | Partio et al. | 372/57 |
| 6,034,978 A | * | 3/2000 | Ujazdowski et al. | 372/34 |
| 7,085,302 B1 | * | 8/2006 | Nagai | 372/55 |
| 2002/0186739 A1 | | 12/2002 | Sandstrom et al. | 372/55 |

FOREIGN PATENT DOCUMENTS

DE  G 94 01 808.1 U1  7/1995

* cited by examiner

*Primary Examiner*—Minsun Oh Harvey
*Assistant Examiner*—Phillip Nguyen
(74) *Attorney, Agent, or Firm*—Stallman & Pollock LLP

(57) ABSTRACT

Improved temperature stabilization can be obtained for pulsed gas discharge laser systems, such as excimer laser systems, using information about the energy dissipation of the system. Temperature sensors have a limited response time, which can lead to undesirable instability in gas temperature. By determining the heat energy provided to the discharge chamber over sufficiently small periods of time, a system controller can account for rapid variations in the temperature of the laser gas. The temperature regulation controller can adjust a flow of cooling liquid into the discharge chamber to account for these rapid variations on a scale that is much shorter than the response time of the temperature sensors. For variations over longer periods of time, the temperature regulation controller can utilize an active heater in contact with the laser tube to heat the laser tube body, thereby uniformly heating the gas in the tube.

7 Claims, 6 Drawing Sheets

*- Prior Art -*

*- Prior Art -*

- *Prior Art* -

- *Prior Art* -

- Prior Art -

500

Direct a flow or relatively cool fluid through a heat exchanger in a gas discharge laser tube in order to remove heat from the laser tube
502

Measure the gas temperature in the laser tube, and optionally the temperature of the relatively cool fluid and laser tube, and provide the temperature(s) to a system controller
504

Examine the pulse pattern and determine an appropriate minimum time period over which the energy transferred to the laser tube should be calculated
506

Calculate the energy transferred to the laser tube during that time period and provide the result to the system controller as an amount of energy dissipation or heat generation
508

Send an adjustment signal from the system controller to a control valve capable of varying the amount of cooling fluid entering the heat exchanger in the laser tube
510

*Figure 5*

TEMPERATURE CONTROL SYSTEMS FOR EXCIMER LASERS

CLAIM OF PRIORITY

This patent application claims priority to U.S. Provisional Patent Application "TEMPERATURE CONTROL SYSTEMS FOR EXCIMER LASERS," No. 60/448,942, filed Feb. 20, 2003, which is hereby incorporated herein by reference.

TECHNICAL FIELD OF THE INVENTION

The present invention relates to temperature control in a gas discharge laser, such as an excimer laser.

BACKGROUND

In typical gas discharge lasers, the performance of the laser can depend, at least in part, on the temperature of the laser gas in the discharge chamber. In many existing gas discharge laser designs, the gas circulation fan and laser discharge are utilized as the primary sources of heat for the laser tube. Using such a design, however, results in an undesirably long time to sufficiently heat the laser tube, or discharge chamber, especially after filling the chamber with a fresh supply of laser gas. Further, the temperature in the laser tube will vary over time due to the burst operation of such a laser. These temperature variations can lead to a corresponding yet undesirable variation in laser output.

Conventional approaches to regulate temperature for gas discharge lasers, and minimize temperature variations, typically involve cooling the laser gas during laser operation, such as by using cooling water flowing through a cooling loop. The loop generally includes tubing exposed to the gas mixture such that the flowing water can remove heat from the mixture. This heat is introduced into the gas mixture during operation when discharges of electrical power are applied to the gas mixture, through main discharge electrodes and/or preionization electrodes. Even with the cooling water flowing and removing heat, the gas mixture typically remains far above room temperature while the electrical pulses are being applied. If the laser pulsing is interrupted, the flow of cooling water can be halted or closed off. Regardless, the laser gas tends to cool down as there is little to no heat added when the laser is not pulsing. When the pulsing is resumed, the gas mixture will heat back up, such as to a cooling-water-stabilized value, within some initial period. While the gas mixture is heating during this initial period, the laser beam parameters can be influenced by the changing temperature.

FIG. 1(a) schematically illustrates a side view of a gas discharge laser tube 100 including a heat exchange circuit 102. The gas discharge laser tube 100 is filled with a gas mixture. A pair of main discharge electrodes 104, as well as one or more preionization electrodes 106, is connected to an electrical discharge circuit (not shown) for energizing the gas mixture as is known in the art. A discharge region 114 is defined between the main electrodes 104. The laser tube has a pair of windows 108 for permitting generated light to exit and enter the tube within the laser resonator (not shown). The heat exchange circuit 102 includes tubing 110 that enters and exits the laser tube 100, allowing fluid to flow into and out of the laser tube. The fluid carries heat away as the fluid exits the laser tube. A fan 112 in the tube circulates the gas mixture through the discharge region 114 past the heat exchange tubing 110, aiding in heat removal.

FIG. 1(b) schematically illustrates a cross-sectional view of the laser tube of FIG. 1(a), including electrodes 104, 106 that define the discharge region 114, the windows 108, the heat exchange tubing 102, and the blower 112, as mentioned above. An upstream gas flow direction 116 and a downstream gas flow direction 118 are depicted. A temperature sensor 120 is also shown, which is disposed downstream of the discharge region 114 and above the heat exchanger 102, such as is described in U.S. Pat. No. 6,034,978, which is hereby incorporated herein by reference.

FIG. 2(a) schematically illustrates a conventional heat exchange circuit 200 for a gas discharge laser, such as an excimer laser. A discharge circuit 202 is shown adjacent to the laser tube, or discharge chamber 204. Inlet tubing 206 carries fluid into the discharge chamber 204 at temperature $T_{in}$, while outlet tubing 208 carries fluid out of the chamber at temperature $T_{out}$. A control valve 210 can open and close a fluid flow loop created between the discharge chamber and an external fluid source 212. A temperature sensor 214 can be used to measure the gas temperature $T_G$ within the chamber 204. A flow control module 216 can be used to adjust the control valve 210 based on the measured temperature $T_G$.

FIG. 2(b) illustrates the heat exchange circuit of FIG. 2(a) including a heater 218 positioned between the external fluid source 212 and the discharge chamber 204. The fluid flows past the control valve 210 to the heater 218 at temperature $T_{in1}$. The fluid is heated by the heater 218, such that the fluid flows from the heater to the discharge chamber 204 at an increased temperature $T_{in2}$. The controller 216 can control both the control valve 210 and the heater 218 based at least in part on signals received from the temperature sensor 214. Cooling water can be heated by passing the water through the heater 218 when burst operation of the laser is interrupted. Adding heat to the cooling circuit is, however, an inefficient and slow approach to altering the temperature of the cooling water during laser operation. Such an approach slowly increases the input water temperature, which flows through the heat exchanger within the laser tube.

When high duty cycle operation is restarted following a pause in high duty cycle operation for a long or short duration, the gas mixture temperature will slowly ramp back up to optimum temperature, which can disturb laser performance during the ramp-up period. Therefore, heat is added to the heat exchange fluid or directly into the laser chamber during the very low duty cycle or standby operation, or during a limited laser off time, to thermally stabilize the laser gas around optimum temperature. Conventional systems have used additional electrical heating of the gas in the laser chamber (see U.S. Pat. No. 5,377,215, hereby incorporated herein by reference) or by heating the incoming fluid in the heat exchanger tubing up to $T_{in2}=40°$ C. . . . 60° C. (see U.S. Pat. No. 6,034,978, hereby incorporated herein by reference). Each of these methods requires an additional module, and is inefficient due to the initial low temperature which must be heated to a high temperature only when the high temperature is desired, thereby leaving an unsatisfactory delay and period of change from low to high temperature. In addition, a very high electrical current is used to provide the power to raise the temperature of the fluid and/or gas mixture to optimum, which is not practical. Moreover, gas temperature overshoots can occur, such as when energy from the heater cannot be instantaneously stopped at the beginning of high duty cycle operation and/or due to the inherently imprecise nature of warming and cooling a heating element across a wide temperature range. Further, these methods are very slow and are unable to adequately follow rapid changes in the mode of laser operation, such as between very low (idle) and very high (exposure) duty cycles of laser operation, with cycle times between fractions of seconds and several minutes.

A gas temperature deviating from the optimum can cause substantial distortions in laser parameters such as pulse-to-pulse stability, overshoot control and burst behavior in general that are unsatisfactory. Even temperature fluctuations of a few degrees centigrade from optimal can have a negative impact on the performance of the laser system.

BRIEF DESCRIPTION OF THE DRAWINGS

FIG. 5 is a flowchart showing a method that can be used in accordance with one embodiment of the present invention.

DETAILED DESCRIPTION

Gas discharge lasers such as excimer lasers generate heat losses during operation. These losses can scale with the power level of the laser, such as in the range of about 100 W for smaller lasers to about 25 kW for commercial industrial lasers. Temperature management for such a laser can focus on the efficient extraction of heat in order to reach a stable operating temperature. Such schemes are described in U.S. patent application Ser. No. 10/112,074, entitled "FAST TEMPERATURE REGULATION FOR GAS LASER," filed Mar. 28, 2002, which is hereby incorporated herein by reference. In many such systems, a gas discharge laser must reach near-nominal operating temperature before the laser output parameters are within specification. It is typically desirable that the time necessary to reach this near-optimal temperature is minimized, in order to minimize downtime and improve throughput. Under certain conditions, such as a new fill of laser gas, the conventional approach to heating by using the discharge and gas circulation is not available. In this case, an active heater can be utilized to heat, or "warm-up," the laser tube. The warm-up time can be determined by the deposited heat load and the heat capacity of the tube. The heat capacity of the tube can depend on the main material of the tube, such as a heat capacity of about 0.896 kJ/kg for aluminum, about 0.385 kJ/kg for copper, and about 0.5 kJ/kg for stainless steel. The total weight of a high power laser tube can be on the order of about 100 kg. An active heater can warm the tube to a nominal temperature within about 10 minutes, which is about the same as the time needed for a new fill. In one such example, an active heater can heat the laser tube from 21° C., or about room temperature, to an operating temperature of 42° C. in about 10 minutes. This requires a heat amount of 1800 kJ (85 kJ/K×21 K=1800 kJ) and a power of 3 kW.

Figure 1A:
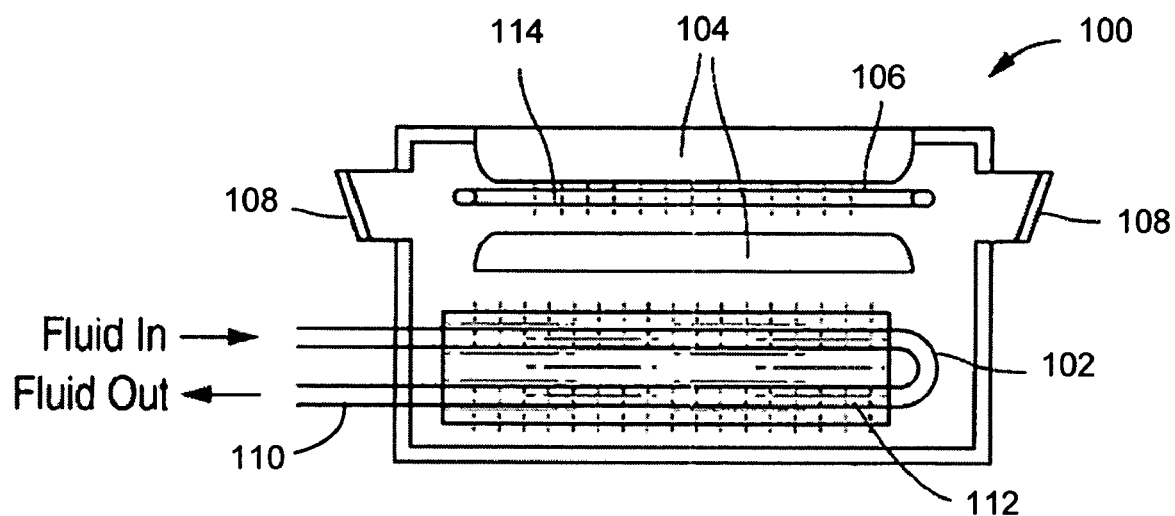
FIG. 1 shows a (a) side view and (b) cross section of a gas discharge laser tube of the prior art.
Figure 1B:
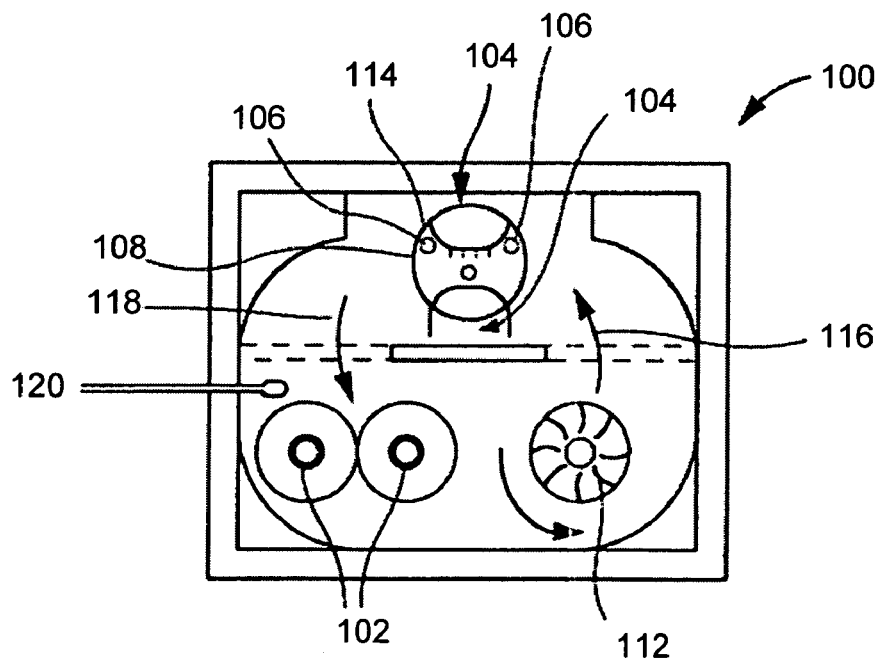
Figure 2A:
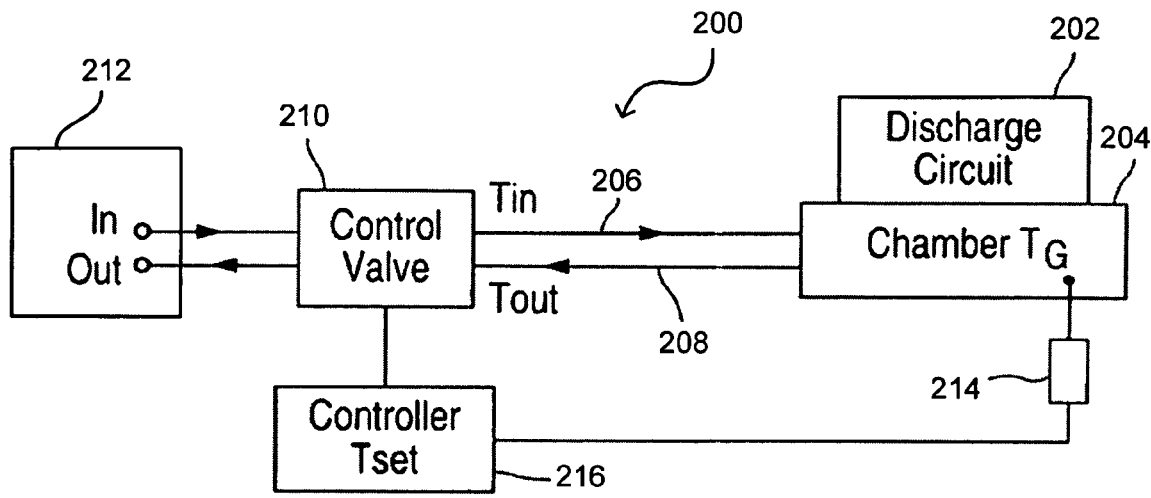
FIG. 2 shows a diagram of conventional heat exchange circuits (a) without and (b) with a heating element.
Figure 2B:
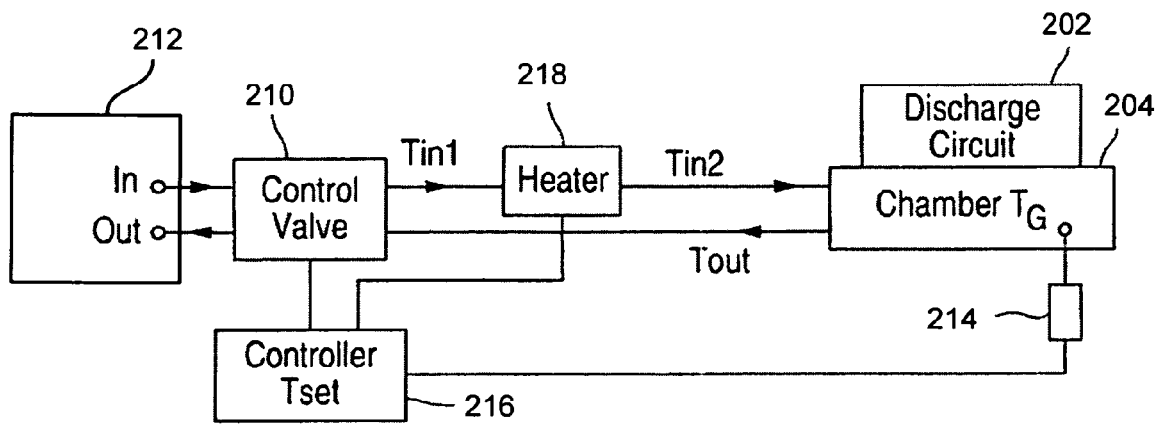
Figure 3:
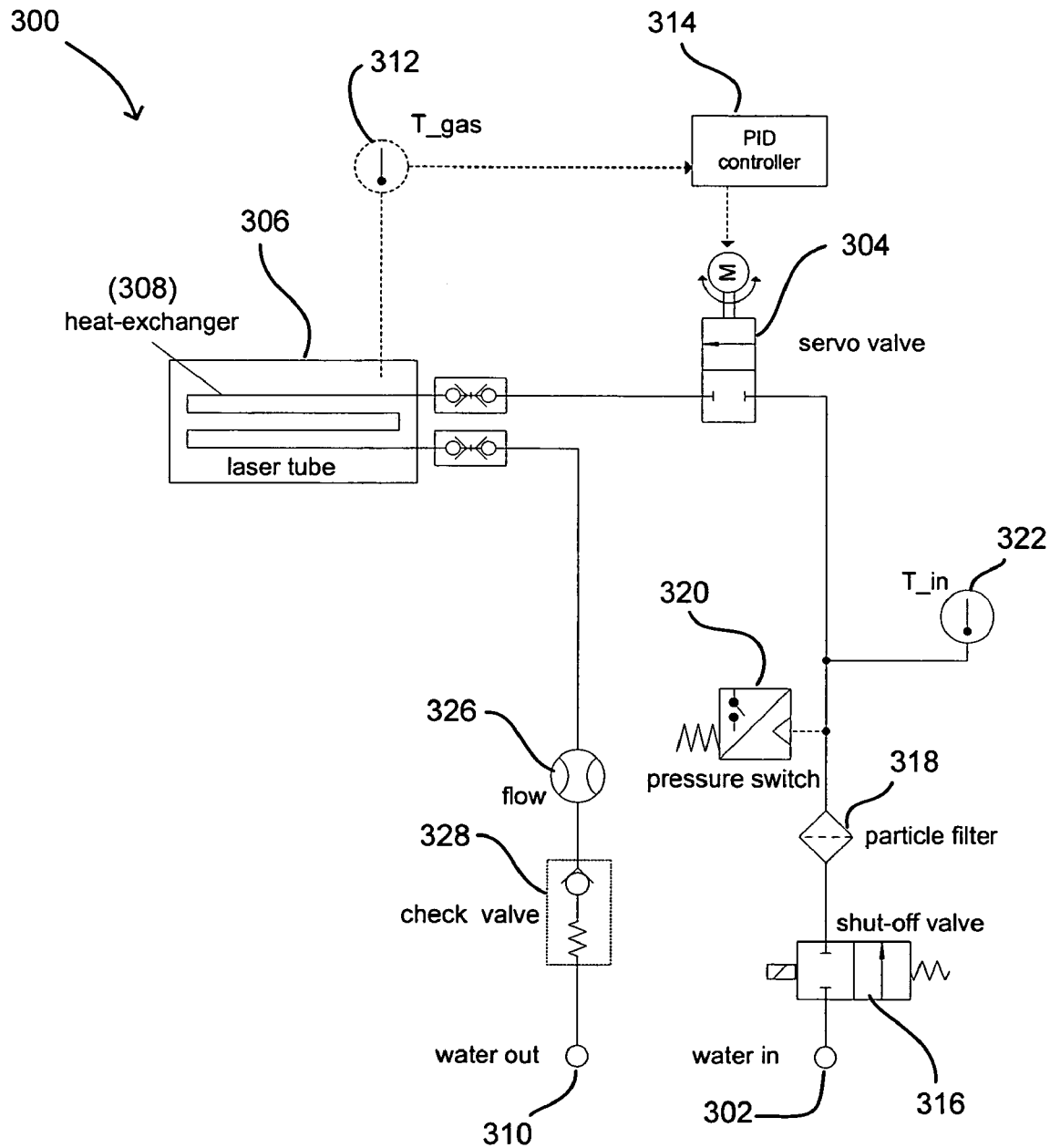
FIG. 3 is a diagram of a water control scheme of the prior art that can be used with the laser tube of FIG. 1.

FIG. 3 shows an existing temperature control scheme 300 based on a water cooling system. In this scheme, a flow of cooling water from a water source 302 is directed through a control valve 304, such as a servo valve, to the laser tube 306. The cooling water passes through a heat exchanger 308 in the laser tube 306, such that heat can be removed from the laser tube. The flow of cooling water is then directed out of the laser tube 306 to a water outlet 310. A temperature sensor 312 can be used to measure the temperature of the gas in the laser tube 306. A controller 314, such as a PID (proportional, integral, differential) controller, can use the information from the temperature sensor 312 to adjust the control valve 304, in order to adjust the amount of cooling water flowing into the laser tube. Shown in the diagram are other basic elements, such as a shut-off valve 316 to stop the flow of water into the system, a particle filter 318 to remove any particulates from the cooling water, a pressure switch 320 to monitor the pressure/flow of the cooling water, a temperature sensor 322 to measure the temperature of the incoming cooling water, bi-directional valves 324 for coupling the heat exchanger 308 to the tubing containing the water flow, a flow meter 326 to monitor the flow of water from the laser tube 306, and a check valve 328 to prevent water from flowing the opposite direction into the laser chamber.

Figure 4:
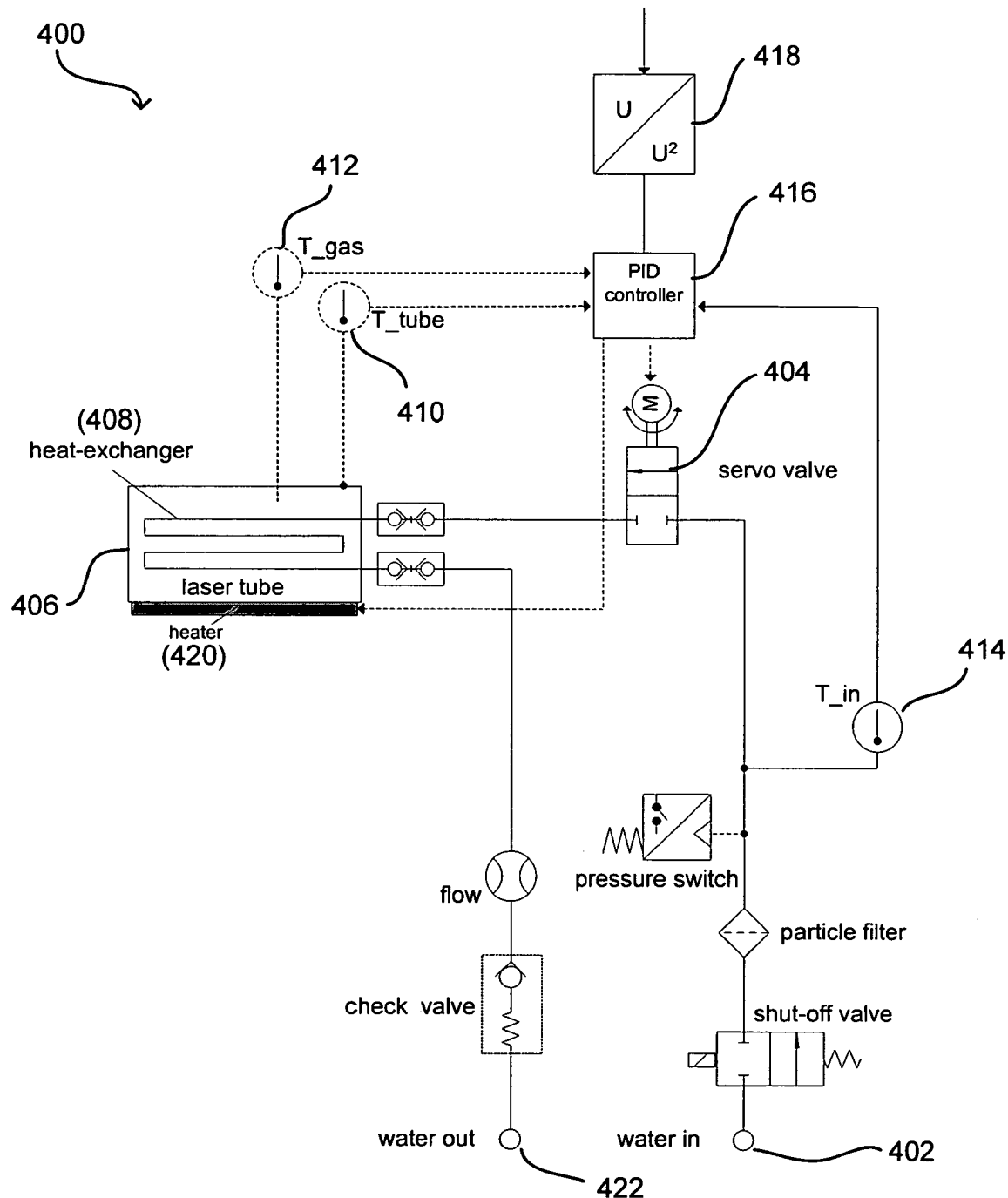
FIG. 4 is a diagram of a laser tube temperature stabilization system in accordance with one embodiment of the present invention.

FIG. 4 shows a diagram of a laser tube temperature stabilization system 400 in accordance with one embodiment of the present invention. In this system, a flow of cooling fluid such as water from a water source 402 is directed through a proportional flow control valve 404, such as a servo valve, to the laser tube 406. The cooling water passes through a heat exchanger 408 in the laser tube 406, such that excess heat can be removed from the laser tube. The flow of cooling water is directed out of the laser tube 406 to a water outlet 422. A first temperature sensor 412 can be used to monitor the temperature of the laser gas in the tube. This embodiment also utilizes a second temperature sensor 410 to monitor the temperature of the body of the laser tube 406. A third temperature sensor 414 can monitor the temperature of the cooling water 414 being input into the system. The positioning of these sensors is illustrative, and could be adjusted as would be apparent to one of ordinary skill in the art. Further, additional or fewer sensors can be used as necessary.

The temperatures from these temperature sensors 410, 412, 414 can be received by a temperature regulation controller 416, which can be a PID controller. The temperature regulation controller can use information about the temperature of the gas in the discharge chamber to determine whether the amount of cooling liquid flowing through the chamber needs to be increased or decreased. The temperature regulation controller can use information about the inlet water temperature to determine the amount by which the flow needs to be increased or decreased. A disadvantage to such an approach is that adjustments are limited by the detection time of the sensors, combined with the fact that the temperature change signals are reactionary. In order to attempt to compensate for these limitations, the temperature regulation controller also can receive a signal from an energy determination module 418, which can be part of the main system controller. The main system controller typically controls the triggering of the discharge based on the determined pulse pattern. As such, the energy determination module can provide a signal to the temperature regulation controller that is indicative of the amount of energy being transferred to the laser tube at different periods in the pattern. The energy signal can be used as an adjustment signal for temperature stabilization as described below. This is possible because, as part of the main system controller, the energy determination module knows when the laser is operating, when pulses occur, and how much energy is applied in each pulse. Since this information is known, the system can anticipate changes in temperature of the laser gas in the discharge chamber due to the energy that will be added over the next period, and can instantly react to changes in the discharge in order to "anticipate" upcoming temperature changes. The temperature regulation controller can utilize the temperatures and the control signal to adjust the flow control valve 404 in order to adjust the amount of cooling water flowing through the heat exchanger 408.

In addition to adjusting the flow control valve 404, a temperature regulation controller 416 can provide a control signal to an active heater 420, or heating element, positioned to heat the body of the laser tube 406. An active heater can be used, for example, to warm the laser tube while the fan (not shown) and laser discharge are not available, such as during a new fill of the laser gas. The active heater 420 also can be utilized to stabilize the overall heat entry to the laser tube 406 by taking into account, and in some instances compensating for, extended gaps in the burst operation of the laser. In some embodiments, the active heater can receive a signal directly from a temperature sensor for the laser tube 406, which can be the same sensor 410 used to provide the tube temperature to the temperature regulation controller. The active heater can heat the laser tube directly when the tube falls below the nominal operating temperature, such as about 40–42° C. In addition, the active heater can receive a signal from the temperature regulation controller 416 that can cause the active heater 420 to heat the tube. Because the active heater can be more suitable to correct for long-term temperature variations, the temperature regulation controller in some embodiments only sends an activation or control signal to the active heater when there will be no transfer of energy to the laser tube through operation of the laser for an extended period of time, such as when the energy signal reads 0 Joules for an extended period of time. As there will be no dissipation of energy in the laser tube, the active heater can be directed to maintain the laser tube at the operating temperature. The use of an active heater can be applied to any wavelength of an excimer laser, for example, and can apply to any application for which a tight temperature control is desired. The active heater can utilize any of a number of sub-modules and strategies capable of controlling and stabilizing the temperature of a gas discharge laser.

The active heater can be any appropriate heater, such as a commercial, electrical heater element that is directly attached to the laser tube, outside of the laser gas. Attaching the element directly to the laser tube can allow the heater to be in excellent thermal contact with the heat sink, which in this case can be the laser tube body itself. The heater element can be constructed from a large foil in one embodiment, which can cover a large portion of the exterior of the laser tube. Such heater foils typically can provide 3.5 kW per square meter, which can be a reasonable match for a 3 kW power requirement. Such a heater also can be built from several discrete heater elements, each of which can be attached to the tube in order to obtain an efficient and substantially homogeneous heat transfer. The active heating element in one embodiment can be a silicon heating mattress, foil heater, or other heating pad which can substantially surround the laser tube, such as heating pads available from Tyco Thermal Controls, having a headquarters in Houston, Tex. Such a heater can have a heating capacity on the order of about 5 kW/m$^2$, for a typical laser tube on the order of about 1 m$^2$ in surface area. An advantage to having a heating pad surrounding the laser tube is that the pad can provide a substantially uniform heating about the laser tube. Existing heating methods, which utilize a heating of the water flowing into the chamber or the use of a heater in the laser chamber itself, can lead to the presence of substantial temperature variations and gradients in the laser tube. Also, the inclusion of a heater element in the discharge chamber can increase the potential for contamination in the laser chamber. Using high thermal conductivity materials for tube construction also can improve the evenness of the temperature distribution about the tube. The heater power can be controlled through use of a control setup or control loop, and the laser tube temperature can be provided as a feedback signal for this control loop.

In addition to heating the gas discharge laser tube during a new fill, the laser may need to remain at a near-nominal operating temperature during idle times in order to maintain all laser output parameters within specification. During certain periods of time the laser can be switched from an operating mode to a stand-by mode or idle mode. In order to resume operation from these modes in a minimum amount of time, it can be desirable to stabilize the operating temperature. Since the operating temperature of the tube can be well above ambient air temperature, the effect of air cooling and corresponding heat loss cannot be neglected. Convection and radiation losses can lead to a drop in tube temperature, even with any water or liquid cooling device(s) turned off completely. To maintain a near-constant temperature during idle periods, an active heater can be used to provide a permanent source of additional heat during these idle periods as described above.

Gas discharge lasers such as excimer lasers typically utilize burst triggering, which can involve short and long pauses, as well as a variation of the repetition rate. Such triggering can lead to a strong variation in heat entry, and can be a good candidate for precise temperature stabilization in accordance with various embodiments of the present invention. A temperature stabilization loop can be implemented which utilizes a proportional flow valve to control the amount of water flowing into the laser heat exchanger as discussed above. The temperature regulation controller controlling the proportional valve can receive and utilize a control signal based on the energy transferred to the laser tube. For instance, the heat entry to the laser tube during pulse operation can be determined by examining the energy per pulse, $E_p$, as well as the number of pulses, n, over a given period of time. In one exemplary system, the energy per pulse is on the order of about 1.5 J, and the laser can have a pulsed operation on the order of 2–4 kHz, such that over a reasonable period of time of about 100 ms, the total energy supplied to the discharge chamber for 400 pulses would be approximately 600 J. The energy transfer, E, to the laser tube during that period can be estimated in zero approximation to the square of the operating voltage V and the number of pulses, n, given by:

$$E \approx nV^2 \text{ (zero approximation)}$$

The energy per pulse, $E_p$, derived from square of operating voltage, can be integrated over an adjustable time window, given by:

$$E_p \sim V^2 \text{ (first order approximation)}$$

$$E = \int_0^n E_p$$

Using such an approach can allow for constantly updated approximations of the amount of heat entry through energy dissipation, which can be used as an adjustment factor for temperature stabilization. Adjustment of the time window to smaller values, which can decrease the number of pulses included in the calculation, can lead to faster reaction times. For instance, in a burst of 400 pulses, the dissipation can be recalculated for each 40 pulses. This smaller time window can constitute a period of time that is significantly shorter than the response time of a temperature sensor used to measure the gas or tube temperature. As a result, a signal corresponding to the energy dissipation can be used to adjust the control signal supplied to the proportional flow valve as soon as the electrical energy is discharged across the electrodes. Hence, steps can be taken to provide temperature control immediately in response to energy discharge rather than waiting for a temperature sensor to actually register an increase in the temperature due to the energy discharge. Further, since PID controllers can have difficulty dealing with rapid changes in input, using the energy information to "anticipate" temperature changes can improve the accuracy of the control signal provided by the PID. While a long term stability of the temperature can be achieved using only a signal from a gas temperature sensor, stability on a much shorter time scale can be obtained using heat dissipation information in addition to the temperature information. Measurement of the input water temperature, as well as other parameters discussed above, also can be used when adjusting the water cooling system.

FIG. 5 shows a flowchart for an exemplary method 500 that can be used in accordance with one embodiment of the present invention. A new fill of gas injected into a laser tube can be brought up to near-nominal temperature, such as about 42° C., using an active heating element. Once the laser gas is at the appropriate temperature, the laser can begin pulsed operation. In order to remove heat generated by the discharge, a flow of relatively cool fluid can be directed through a heat exchanger in the discharge tube in order to remove heat from the laser tube 502. The fluid can be a relatively cool liquid, such as water at room temperature, or can be a relatively cool gas. The temperature of the relatively cool fluid, as well as the temperature of the laser tube and the temperature of the laser gas, can be measured by temperature sensors, such as temperature sensors referred to in the industry as PT-100 temperature sensors, and provided to a system controller 504. An examination of the pulse pattern can be made, and an appropriate time period can be determined over which the energy transferred to the laser tube should be calculated 506. Typically, it can be desirable to minimize the time period in order to increase the reaction speed of the system. Depending on the pulse pattern, it can be beneficial to adjust the time period for different locations in the pattern. For example, a shorter time period might be used for a section of the pattern having 30 consecutive bursts than might be used for a section of the pattern having a long pause.

Once the appropriate time period is determined, the energy transferred to the laser tube during that period can be calculated and provided to a temperature regulation controller as an amount of energy dissipation or heat generation 508. The temperature regulation controller can receive a feedback signal from each of the various temperature sensors in the feedback loop, such as a sensor for the tube temperature and a sensor for the gas temperature inside the tube. The temperature regulation controller can utilize the dissipation information from the main system controller as an "influence factor" by which adjustments can be made in response to changes in the energy dissipation in the laser tube. The temperature regulation controller can evaluate the temperature and dissipation signals, and can determine any appropriate adjustment to the system. If the adjustment requires a fast response, the temperature regulation controller can send an adjustment signal to a proportional flow control valve capable of varying the amount of cooling fluid entering the heat exchanger in the laser tube 510. The adjustment of the control valve can happen on a time scale that is significantly faster than the response time of any of the individual temperature sensors. If the adjustment does not require a fast response, or will remain somewhat constant for a significant period of time, the temperature regulation controller also can send an adjustment signal to an active heater in contact with the laser tube, in order to direct the heater to apply heat to the body of the laser tube. For instance, in one embodiment the PID controller sends a signal to the active heater when the energy supplied to the chamber remains at a value of 0 J for a specified length of time, such as on the order of about 3.0 seconds.

Figure 6:
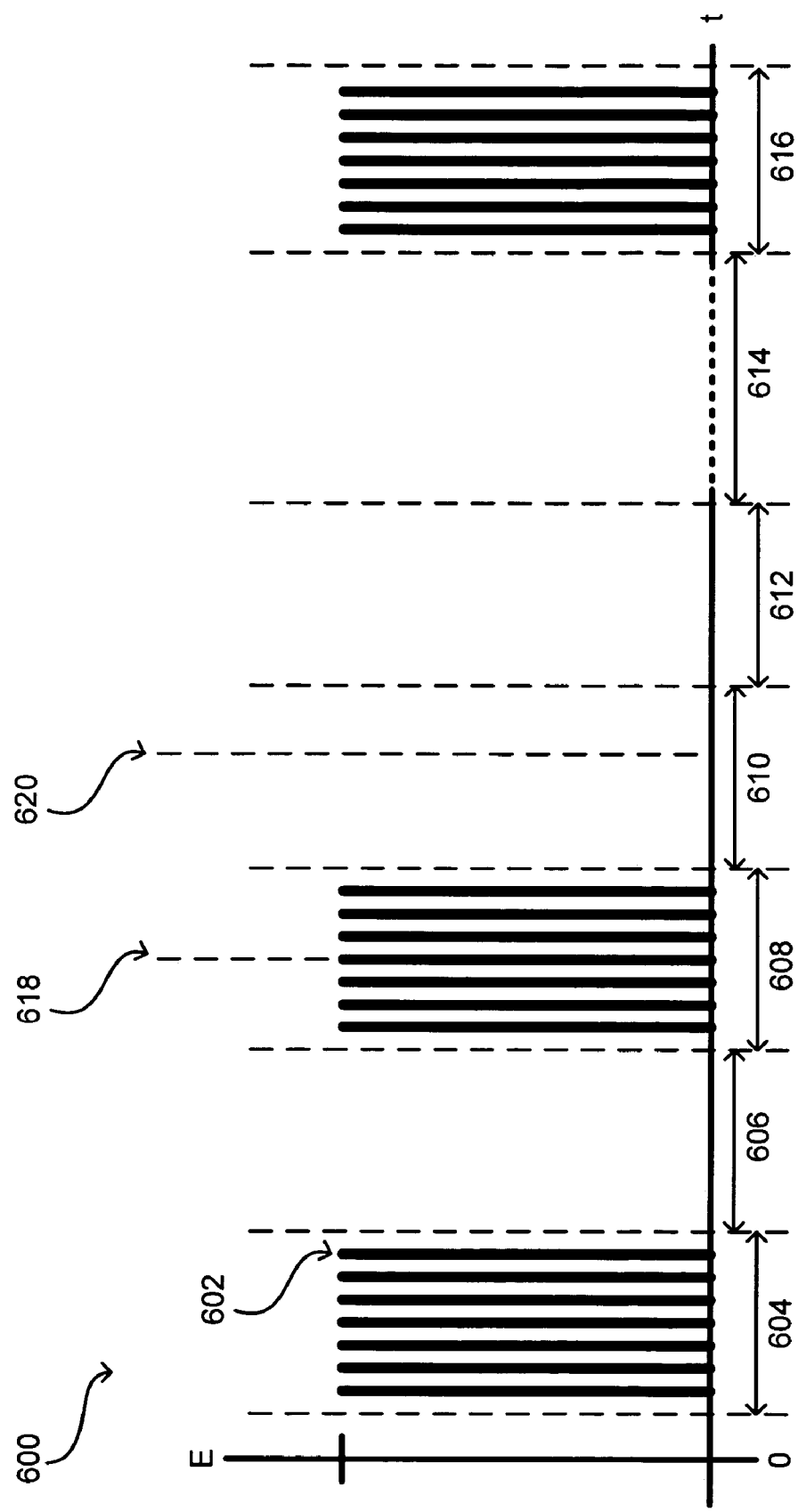
FIG. 6 is a simplified plot of the energy discharged in a discharge chamber as a function of time for a pulse pattern that can be used in accordance with the system of FIG. 4.

FIG. 6 shows a simplified diagram of a pulse pattern 600 that can be used in a gas discharge laser. The plot is meant for explanation purposes only, as the actual size, number, and shape of energy features 602 in the pattern can vary substantially from that used in an actual system. In a system such as that described with respect to FIG. 4, there can be an initial warm-up period to heat the gas in the discharge chamber from near room temperature (around 25° C.) to near-optimal operating temperature (around 42° C.). During this time, the temperature regulation controller can send a signal to an active heater in contact with the body of the laser tube in order to heat the tube, thereby increasing the temperature of the gas in the discharge chamber. Once the chamber gas is at an appropriate operating temperature, the temperature regulation controller can direct the heater to no longer apply heat to the laser tube, or to apply a lesser amount of heat to the laser tube, depending on the system and method used. The active heating element can still receive a signal from a temperature sensor in contact with the laser tube, allowing the active heating element to apply an amount of heat necessary to maintain the laser tube at the near-nominal temperature.

Either at the time of operation, or before the laser begins to operate, the length of time for which the temperature regulation controller will receive updated energy signals can be determined. This can be determined automatically or manually, using for example a software program or manual calculation as would be known to one of ordinary skill in the art. The lengths can be minimized in order to provide faster and more accurate temperature regulation. For example, in the pattern of FIG. 6, it might be appropriate to select time periods that are centered around bursts 604, 608 and/or gaps 606, 610 in the pattern. Once the laser begins pulsed operation, a system controller which controls the pulsing of the laser electrodes can send a signal to the temperature regulation controller that is representative of the amount of energy that will be supplied to the gas mixture over that period. The temperature regulation controller then can use the energy information in combination with temperature information from one or more temperature sensors, to adjust the temperature applied to, or removed from, the laser tube.

For instance, in the pattern of FIG. 6, a substantial amount of energy will be supplied to the laser gas during period 604. During this period, the temperature regulation controller can increase the amount of water flowing through a heat exchanger in the discharge chamber in order to remove the excess heat that will be introduced into the chamber during this period. Without information about the energy, the temperature regulation controller would have to wait for the temperature to change after the pulses begin discharging into the laser gas, and for the temperature sensors to detect the temperature change and report back to the temperature regulation controller. During period 606, where there will be no discharging of the main electrodes, the temperature regulation controller can decrease the amount of water flowing through the heat exchanger by sending a signal to the proportional flow valve to reduce the flow of water to the laser tube. The increase and decrease in water flow can be repeated, respectively, for periods 608 and 610.

At period 612, the temperature regulation controller will notice that another gap exists in the pulse pattern. At this point, the temperature regulation controller can again decrease the flow of water through the heat exchanger, or can leave the flow the same as in period 610. After period 612, however, the temperature regulation controller can determine that the energy supplied to the chamber for an extended period of time has been 0 Joules. At this point, the temperature regulation controller can send a signal to the active heating element to begin heating the body of the laser tube, in order to maintain the gas temperature at an operating temperature over an extended idle period 614 (which can include several time periods not shown). Once the pulses begin again in period 616, the temperature regulation controller can signal to the active heating element that heat no longer need be applied at a rate necessary to maintain the temperature of the laser gas, and can signal to the proportional flow valve that the flow of water through the discharge chamber can again increase. This combined use of the proportional control valve and active heater based on the energy provided to the laser gas can provide for a gas temperature that is significantly more consistent than in existing systems. In order to further improve the consistency, the time periods can be further shortened, such as by dividing periods 608 and 610 in half as shown by designations 618 and 620. In this case, the temperature regulation controller can decide to further increase the flow during the second half of period 608 as shown, since the temperature might tend to rise after the pulses have stabilized for a given burst, for example. The temperature controller also can reduce the flow to a first flow rate during the first half of period 610, immediately after a burst, then to a second flow rate during the second half of period 610, which is not immediately following a burst. Many other variations and selections can be made when setting the length of periods relative to a burst pattern, which can depend on many factors such as the response time of the components, the shape of the pulse pattern, and the temperature consistency desired.

Temperature Gradients

In addition to the temperature of the laser gas, the presence of temperature gradients in the gas also can be significant. Heat can be transferred to the laser gas in the discharge, then exchanged with a built-in heat exchanger. A heat exchanger is shown, for example, as element 408 in FIG. 4. In a standard case, the heat exchanger can utilize of flow of a coolant, such as water, and can present a large surface with fins in order to reach efficient heat exchange with the gas. In a standard design utilizing cooling coils, the outer surface is in contact with the gas and removes heat from the gas through forced convection. The transfer efficiency can be a function of the temperature gradient. Water entering the heat-exchanger can have a minimum temperature $T_{in}$, whereas water leaving the heat-exchanger can have a maximum temperature $T_{out}$. The heat transfer efficiency can be high at the entrance and low at the output, which can result in a temperature gradient in the laser gas. In order to minimize the presence of such a gradient, each heat exchanger can be somewhat U-shaped (see element 408 of FIG. 4 for a more detailed view). Gas hitting the relatively cold portion of the heat-exchanger then also can hit the relatively warm portion of the heat exchanger. Such an arrangement can lead to a more even heat transfer profile of the heat exchanger, and can minimize the effect of temperature gradients. Further, the surface of the heat exchanger can be structured such that the heat transfer is almost perfectly even. Namely, the fins of the heat exchanger can be partially removed or shaped to balance the heat transfer. Removing fins from near the entrance section of the heat exchanger can reduce the exchange, and can lead to a smoother temperature profile. This entrance section can be of particular concern after trigger pauses. After a trigger pause of 20 seconds or longer, for example, the coolant flow can be stopped and the exchanger can approach thermal equilibrium. After triggering is resumed, the water flow can begin and, in this phase, can lead to an asymmetric heat transfer. This asymmetric heat transfer can occur primarily at the entrance. This effect can be greatly reduced with optimized shaping of the heat transfer surface.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A laser comprising:
   a gas discharge chamber having at least two electrodes for energizing a laser gas in the chamber to generate optical pulses according to a pulse pattern;
   a fluid heat exchanger located in the discharge chamber;
   an external fluid source providing fluid to the heat exchanger;
   a flow control valve for controlling the amount of fluid provided to the heat exchanger;
   a first temperature sensor for measuring the temperature of the laser gas within the discharge chamber and generating first temperature signals;
   a second temperature sensor for measuring the temperature of the discharge chamber body and generating second temperature signals; and
   a temperature regulation controller for controlling the flow control valve, said controller receiving both the first and second temperature signals, said controller adjusting the flow control valve in response to both the first and second temperature signals.

2. A laser as recited in claim 1, further including a third temperature sensor for measuring the temperature of the fluid from the source and generating third temperature signals, said temperature regulation controller for controlling the flow control valve in response to the first, second and third temperature signals.

3. A laser as recited in claim 1, further including a heater element in contact with the laser tube and controlled by said temperature regulation controller based on said first and second temperature signals.

4. A method for stabilizing gas temperature in a pulsed gas discharge laser, said laser having a discharge chamber, said method comprising the steps of:
   directing a flow of cooling fluid through tubing disposed at least partially within the discharge chamber of the laser;

measuring the temperature of the gas in the discharge chamber and generating first temperature signals; and measuring the temperature of the discharge chamber body and generating second temperature signals; and adjusting the amount of cooling fluid flowing through the tubing based on both the first and second temperature signals.

5. A method as recited in claim 4, further including the step of measuring the temperature of the cooling fluid and generating third temperature signals and adjusting the amount of cooling fluid flowing through the tubing based on the first, second and third temperature signals.

6. A method as recited in claim 4, further including the step of heating the discharge chamber using an active heating element substantially surrounding the laser tube.

7. A method as recited in claim 4, further including the steps of:

determining an amount of energy dissipation over a period of a pulse pattern of the laser in order to determine an amount of energy dissipation in the discharge chamber; and adjusting the amount of cooling fluid flowing through the tubing based, at least in part, on the amount of energy dissipation over that period of the pulse pattern.

* * * * *